United States Patent
Herzberg et al.

(10) Patent No.: US 8,998,301 B2
(45) Date of Patent: Apr. 7, 2015

(54) CONTROL PLATFORM FOR A ROAD MAKING MACHINE

(71) Applicant: Joseph Voegele AG, Ludwigshafen/Rhein (DE)

(72) Inventors: Ingo Herzberg, Angelbachtal (DE); Tobias Gotterbarm, Limburgerhof (DE)

(73) Assignee: Joseph Voegele AG (DE)

( * ) Notice: Subject to any disclaimer, the term of this patent is extended or adjusted under 35 U.S.C. 154(b) by 0 days.

(21) Appl. No.: 13/860,758

(22) Filed: Apr. 11, 2013

(65) Prior Publication Data

US 2013/0270865 A1    Oct. 17, 2013

(30) Foreign Application Priority Data

Apr. 12, 2012 (DE) ............... 20 2012 003 668 U

(51) Int. Cl.
 *B62D 25/02* (2006.01)
 *E01C 19/48* (2006.01)

(52) U.S. Cl.
 CPC ............... *B62D 25/02* (2013.01); *E01C 19/48* (2013.01); *E01C 2301/30* (2013.01)

(58) Field of Classification Search
 CPC ........ B62D 25/02; E01C 19/48; E01C 19/002
 USPC ............ 296/1.09, 190.01, 190.03, 190.08, 296/190.1, 190.11; 280/748, 749; 180/89.12, 89.13
 See application file for complete search history.

(56) References Cited

U.S. PATENT DOCUMENTS

| | | | | |
|---|---|---|---|---|
| 4,907,835 A * | 3/1990 | Salters | .................. | 296/1.09 |
| 5,364,479 A | 11/1994 | Boattini et al. | | |
| 5,851,085 A * | 12/1998 | Campbell | .................. | 404/75 |
| 6,193,437 B1 * | 2/2001 | Heims | .................. | 404/110 |
| 6,530,448 B2 * | 3/2003 | Abels et al. | .................. | 180/271 |
| 6,808,038 B2 * | 10/2004 | Schneider | .................. | 180/271 |
| 6,902,024 B2 * | 6/2005 | Miiller et al. | .................. | 180/271 |
| 7,429,075 B2 * | 9/2008 | Turnbull et al. | .................. | 296/190.11 |
| 7,677,646 B2 * | 3/2010 | Nakamura | .................. | 296/190.08 |
| 8,016,345 B1 * | 9/2011 | Goddard et al. | .................. | 296/190.01 |
| 2005/0224269 A1 * | 10/2005 | Dahl | .................. | 180/89.12 |
| 2011/0215613 A1 * | 9/2011 | Major et al. | .................. | 296/190.01 |

FOREIGN PATENT DOCUMENTS

| | | |
|---|---|---|
| DE | 9317225 U1 | 1/1994 |
| JP | 11060294 A | 3/1999 |
| JP | 2004256342 A | 9/2004 |
| WO | 0032427 A1 | 6/2000 |

OTHER PUBLICATIONS

Grosse Kettenfertiger SD2500C / SD2550CS / SD2550C / SD2550CS—DYNAPAC Part of the Atlas Copco Group, Pole Position Paver Facts, pp. 1-16 (the English version appears to be dated Oct. 28, 2011).

(Continued)

*Primary Examiner* — Glenn Dayoan
*Assistant Examiner* — Jason S Daniels
(74) *Attorney, Agent, or Firm* — Brooks Kushman P.C.

(57) ABSTRACT

A control platform for a road making machine comprises a fall protection for preventing the operator from falling down from the control platform. The disclosure is characterized by the fall protection comprising a pane of laminated glass.

20 Claims, 2 Drawing Sheets

(56) References Cited

OTHER PUBLICATIONS

German Search Report Dated Mar. 13, 2013, Applicant Joseph Voegele AG, Application No. 20 2012 003 668.6, 5 Pages.

Japanese Office Action Dated May 30, 2014, Application No. 2013-069554, Pages.

* cited by examiner

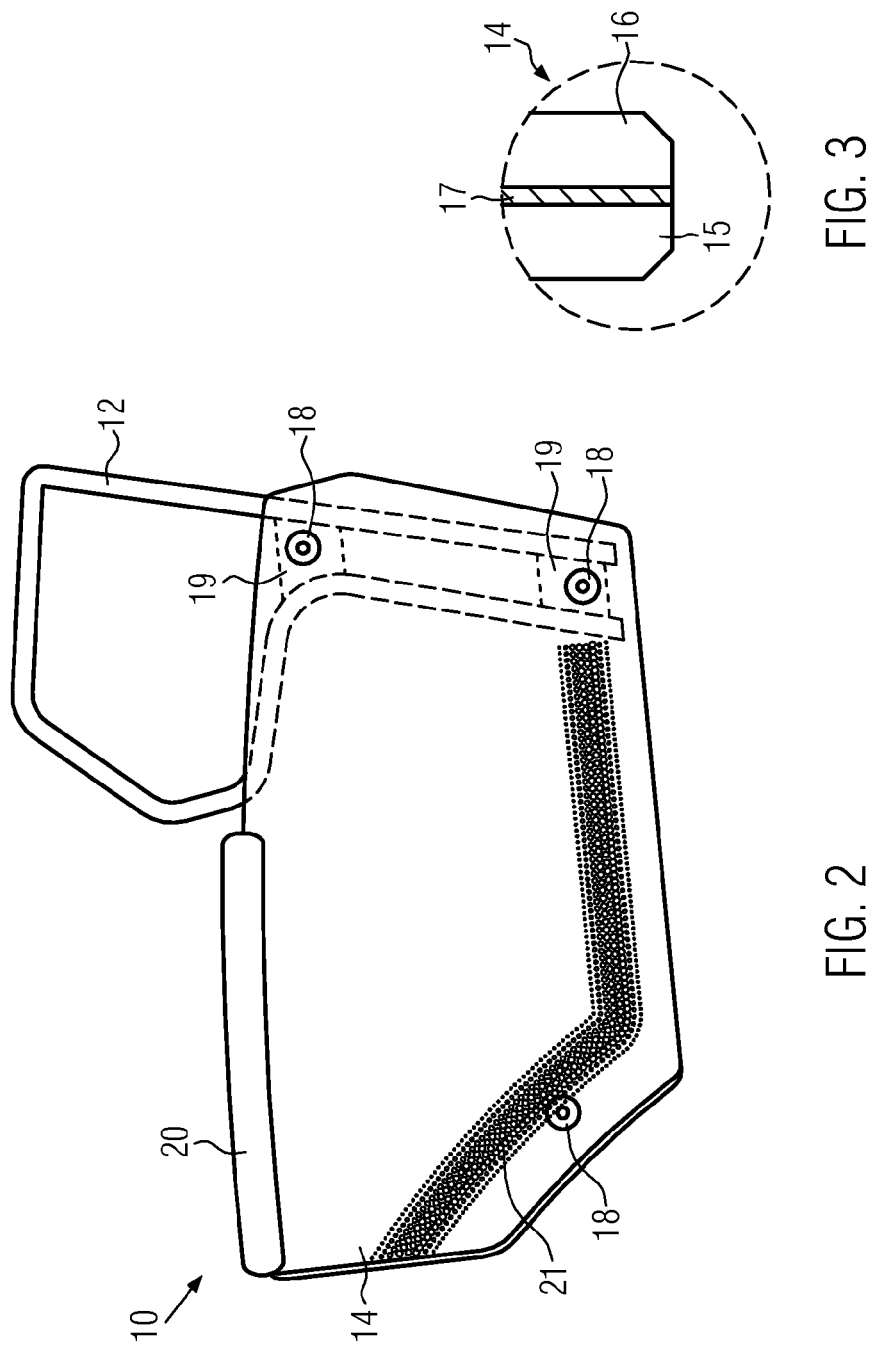

CONTROL PLATFORM FOR A ROAD MAKING MACHINE

CROSS-REFERENCE TO RELATED APPLICATIONS

This application claims foreign priority benefits under 35 U.S.C. §119(a)-(d) to German patent application number DE 20 2012 003 668.8, filed Apr. 12, 2012, which is incorporated by reference in its entirety.

TECHNICAL FIELD

The disclosure relates to a control platform for a road making machine, which can in particular be a road finishing machine or a charger for a road finishing machine.

BACKGROUND

Road making machines usually have a control platform on which operational controls, and in most cases also a seat for the operator of the machine, are located. In many road making machines, the control platform is comparatively high above the bottom to offer space for machine components and provide an extensive overview over the construction site for the operator. Due to the height of these control platforms, however, a fall protection is required at least at the sides of the control platform to prevent operators from falling down from the control platform. In open control platforms, that means control platforms that are not closed like cabins, rails are always used as fall protection. For road finishing machines, this is known, for example, from DE 200 13 638 U1.

SUMMARY

It is an object of the disclosure to improve a control platform for a road making machine.

The control platform according to the disclosure, which can in particular be an open control platform (meaning that it is not closed like a cabin), provides for the fall protection to comprise a pane of laminated glass (LG), i.e., laminated safety glass. While this laminated glass is comparatively heavy, it offers the advantage of being very stable, cracking hardly and splintering never. Even after it has been partially destructed, the laminated glass still offers a certain protective effect. It is therefore ideally suited for the demands in the operation of a road making machine as it cannot break or splinter, for example even in case of falling rocks on the construction site. This considerably increases safety at work. Simultaneously, the pane of laminated glass offers the operator clearly better protection from weather influences, such as snow or rain, compared to a conventional rail, and it permits, also compared to a rail, a clearly less disturbed, free view to the site.

Preferably, the pane of laminated glass (LG) comprises two panes of tempered safety glass (TSG) and at least one sheet provided between the two panes of tempered safety glass. This sheet can be a bonding sheet, for example of polyvinyl butyral (PVB), which glues the two panes of tempered safety glass together and still supports and bonds these single panes in case of splintering.

It is particularly advantageous for the pane of laminated glass to be connected with a structure of the control platform at individual fastening points, for example with a rail of the control platform. By the mounting only at certain fastening points, the pane can be easily attached.

The convenience for the operator of the road making machine can be improved if an arm rest is mounted to the fall protection, in particular to the pane of laminated glass.

Light influences which might disturb the operator of the road making machine, for example reflections from puddles on the site, can be reduced if a print is provided at least in sections on the pane of laminated glass. This print can be applied onto the pane of laminated glass and/or onto the sheet between two individual glass panes in the form of a screen printing.

The disclosure relates to a road making machine with a control platform of the type described above, in particular to a road finishing machine or a charger for a road finishing machine.

Below, advantageous embodiments will be illustrated more in detail with reference to the attached drawings.

BRIEF DESCRIPTION OF THE DRAWINGS

FIG. 2 is the fall protection for the control platform of the road making machine; and FIG. 3 is a cross-section through the lower end of the pane of the fall protection.

DETAILED DESCRIPTION

Figure 1:
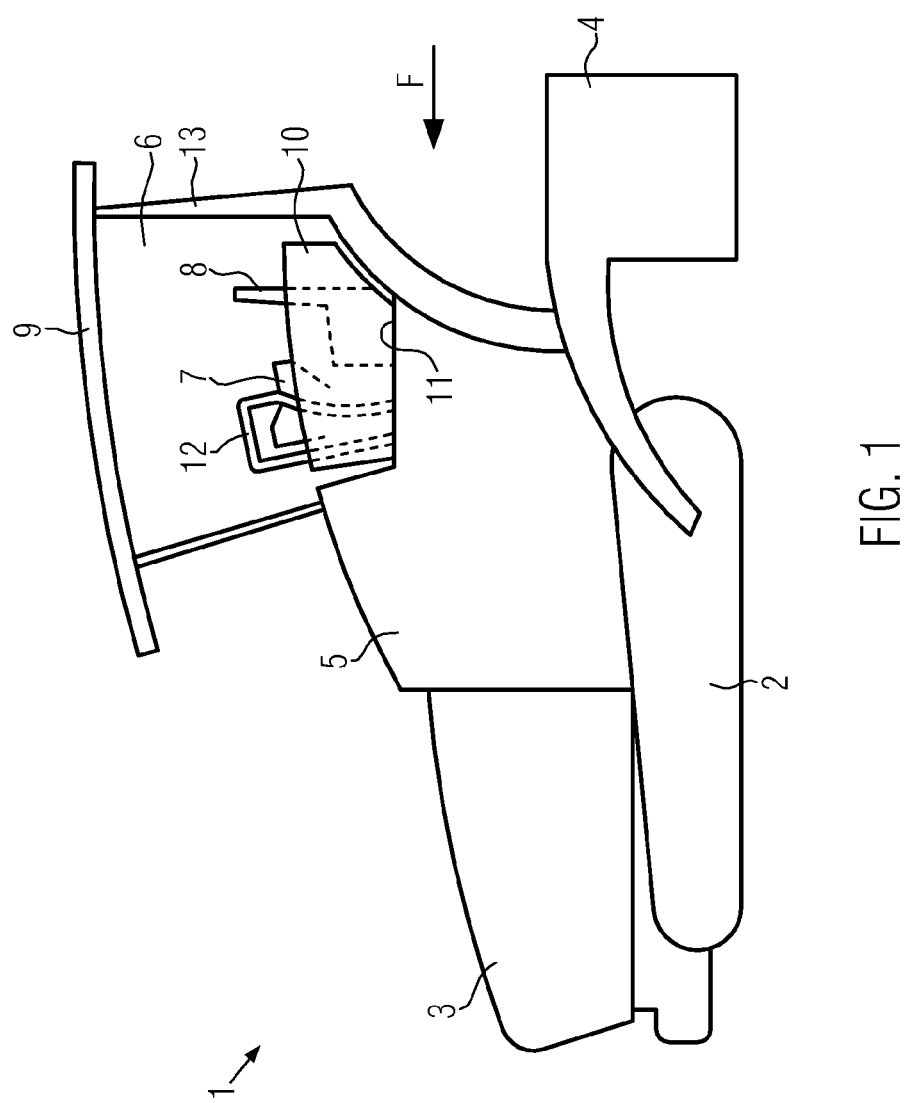
FIG. 1 is an embodiment of a road making machine according to the disclosure.

FIG. 1 schematically shows in a side view a road making machine 1 according to the disclosure which is here a road finishing machine 1. This road finishing machine 1 by usual means has a running gear 2 (here in the form of a tracklaying gear), a material bunker 3, a screed 4 towed by the road finishing machine 1, an engine block 5, and a control platform 6 disposed above the engine block 5. This control platform 6 is an open control platform 6 which is consequently not closed like a cabin. It has a control panel 7 with operational controls for operating the road making machine 1, a seat 8 for the operator, and a roof 9.

Both on the left and on the right side of the road making machine 1 in the direction of motion F, the control platform 6 has a fall protection 10. This fall protection 10 prevents the operator from falling down from the control platform 6. It extends to a height of maximally approximately 70 cm or 80 cm above the bottom 11 of the control platform 6. As a structure of the control platform 6, furthermore a rail 12 or a rail section is provided to which a laminated glass pane 14 of the fall protection 10 is fixed. Additionally or as an alternative, the laminated glass pane could also be fixed to other structure elements, for example to a bar 13 for supporting the roof 9.

FIG. 2 shows in a side view the fall protection 10 on the right side of the control platform 6 in the direction of motion F. The fall protection 10 has a pane 14 of laminated glass (LG). As can be seen in the cross-section at the lower end of this pane 14 in FIG. 3, the laminated glass pane 14 has two panes 15, 16 of tempered safety glass (TSG). These two tempered safety glass panes 15, 16 are connected to each other by one or several foils or sheets 17. The sheet 17 can be a bonding sheet, in particular of PVB.

The pane 14 is connected with a structure 12 of the control platform 6, in particular with a rail section 12 of the control platform 6, at three fastening points 18. Mounting clips 19 can be provided between the fastening points 18 and the rail section 12.

Furthermore, an arm rest 20 is located at the upper edge of the LG pane 14. It improves the comfort for the operator of the road making machine 1 by being wider than the upper edge of the LG pane 14. The arm rest 20 can moreover be padded.

Finally, on a section of the LG pane 14, a print 21 in the form of a screen printing is applied to improve the appearance of the fall protection, reduce disturbing light influences, and improve the subjective sense of safety of the operator compared to a completely transparent glass pane.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A control platform for a road making machine, the control platform comprising:
   a fall protection for preventing an operator from falling down from the control platform, the fall protection including a pane of laminated glass;
   a rail to which the pane of laminated glass is connected; and
   spaced apart mounting clips connected to fastening points on the pane of laminated glass, each mounting clip extending between two spaced apart portions of the rail for connecting the pane of laminated glass to the rail.

2. The control platform according to claim 1 wherein the pane of laminated glass comprises two panes of tempered safety glass and at least one foil between the two panes of tempered safety glass.

3. The control platform according to claim 1 further comprising a print provided on the pane of laminated glass.

4. A road making machine comprising a control platform according to claim 1.

5. The road making machine according to claim 4 wherein the road making machine is a road finishing machine or a feeder for a road finishing machine.

6. The control platform according to claim 1 wherein the fall protection extends to a maximum height of approximately 80 cm above a bottom of the control platform.

7. The control platform according to claim 1 further comprising an arm rest mounted to the fall protection.

8. The control platform according to claim 7 wherein the arm rest is located at a top edge of the pane of laminated glass.

9. A control platform for a road making machine, the control platform comprising:
   a fall protection for preventing an operator from falling down from the control platform, the fall protection comprising a pane of laminated glass; and
   a rail to which the pane of laminated glass is connected at fastening points, wherein the rail is fixed with respect to a bottom of the control platform and has a free section that extends above the pane of laminated glass, and the free section is disposed inwardly of at least one side edge of the pane of laminated glass.

10. The control platform according to claim 9 wherein the pane of laminated glass comprises two panes of tempered safety glass and at least one foil between the two panes of tempered safety glass.

11. The control platform according to claim 9 further comprising an arm rest mounted to the fall protection.

12. The control platform according to claim 9 further comprising a print provided on the pane of laminated glass.

13. A road making machine comprising a control platform according to claim 9.

14. The road making machine according to claim 13 wherein the road making machine is a road finishing machine or a feeder for a road finishing machine.

15. A control platform for a road making machine, the control platform comprising:
   a fall protection for preventing an operator from falling down from the control platform, the fall protection comprising a pane of laminated glass, and an arm rest mounted to the pane of laminated glass, wherein the pane of laminated glass extends upward from a bottom of the control platform.

16. The control platform according to claim 15 wherein the pane of laminated glass comprises two panes of tempered safety glass and at least one foil between the two panes of tempered safety glass.

17. The control platform according to claim 15 further comprising a rail to which the pane of laminated glass is connected at fastening points.

18. The control platform according to claim 15 wherein the fall protection extends to a maximum height of approximately 80 cm above a bottom of the control platform.

19. A road making machine comprising a control platform according to claim 15.

20. The control platform according to claim 15 wherein the arm rest is located at a top edge of the pane of laminated glass.

* * * * *